US007954062B2

(12) United States Patent
Bright et al.

(10) Patent No.: US 7,954,062 B2
(45) Date of Patent: May 31, 2011

(54) APPLICATION STATUS BOARD MITIGATION SYSTEM AND METHOD

(75) Inventors: Marion S. Bright, Charlotte, NC (US); Scott D. Burkhard, Huntersville, NC (US); Rahul Jindani, Newbury Park, CA (US); Gregory L. McKee, Concord, NC (US); Penny J. Peachey-Kountz, South Burlington, VT (US); James D. Scott, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 10/905,403

(22) Filed: Jan. 3, 2005

(65) Prior Publication Data

US 2006/0150105 A1 Jul. 6, 2006

(51) Int. Cl.
*G06F 3/048* (2006.01)

(52) U.S. Cl. ............. 715/772; 700/83; 714/46; 714/48; 715/736

(58) Field of Classification Search .......... 715/734–737, 715/772, 965–970; 700/83–85; 714/46–48
See application file for complete search history.

(56) References Cited

U.S. PATENT DOCUMENTS

| 4,707,852 | A | * | 11/1987 | Jahr et al. ................. 379/106.03 |
| 4,720,782 | A | * | 1/1988 | Kovalcin ......................... 700/83 |
| 4,849,879 | A | * | 7/1989 | Chinnaswamy et al. ....... 706/45 |
| 4,858,152 | A |   | 8/1989 | Estes |
| 5,062,055 | A | * | 10/1991 | Chinnaswamy et al. ..... 702/182 |
| 5,367,670 | A | * | 11/1994 | Ward et al. ..................... 714/47 |
| 5,479,598 | A | * | 12/1995 | Feitelson et al. ............. 715/772 |
| 5,506,955 | A | * | 4/1996 | Chen et al. ..................... 714/26 |
| 5,621,663 | A | * | 4/1997 | Skagerling ................... 702/186 |
| 5,630,127 | A |   | 5/1997 | Moore et al. |
| 5,636,376 | A | * | 6/1997 | Chang ........................... 717/127 |
| 5,673,386 | A | * | 9/1997 | Batra ............................ 714/38 |
| 5,675,798 | A | * | 10/1997 | Chang .......................... 709/224 |
| 5,805,785 | A |   | 9/1998 | Dias et al. |
| 5,819,021 | A | * | 10/1998 | Stanfill et al. .................. 714/15 |
| 5,845,116 | A | * | 12/1998 | Saito et al. ..................... 718/103 |
| 5,862,381 | A | * | 1/1999 | Advani et al. ................. 717/125 |

(Continued)

OTHER PUBLICATIONS

Research Disclosure, "Bloodhound Server Monitor Package", 435152, Jul. 2000, pp. 1289-1293.

*Primary Examiner* — Ba Huynh
*Assistant Examiner* — Eric Wiener
(74) *Attorney, Agent, or Firm* — Gibb I.P. Law Firm, LLC; Richard M. Kotulak, Esq.

(57) ABSTRACT

A system and method for monitoring computer applications comprising an application component table comprising a plurality of applications and application functions, wherein the applications comprise data identifying a functional status of the applications; a processor adapted to analyze the functional status of the applications based on the data; and a single status board user interface adapted to display the functional status of the applications, wherein the processor is adapted to predict when a running time of an application will be completed. The processor is adapted to determine whether the application functions fail when the applications are running; diagnose a cause of failure of the application functions; and indicate the cause of failure to a user. The processor is adapted to reconciliate information across processes supporting the applications. The system and method is adapted to send alerts to the single status board user interface of errors found in the processes.

11 Claims, 8 Drawing Sheets

U.S. PATENT DOCUMENTS

| | | | | |
|---|---|---|---|---|
| 5,867,659 A * | 2/1999 | Otteson | | 709/224 |
| 5,870,604 A * | 2/1999 | Yamagishi | | 718/105 |
| 5,893,905 A * | 4/1999 | Main et al. | | 705/11 |
| 5,905,868 A * | 5/1999 | Baghai et al. | | 709/224 |
| 5,909,217 A * | 6/1999 | Bereiter | | 715/854 |
| 5,944,782 A * | 8/1999 | Noble et al. | | 709/202 |
| 5,999,179 A * | 12/1999 | Kekic et al. | | 715/734 |
| 6,006,249 A * | 12/1999 | Leong | | 718/107 |
| 6,057,835 A * | 5/2000 | Sato et al. | | 715/759 |
| 6,057,839 A * | 5/2000 | Advani et al. | | 715/784 |
| 6,115,640 A | 9/2000 | Tarumi | | |
| 6,128,016 A * | 10/2000 | Coelho et al. | | 715/808 |
| 6,133,919 A * | 10/2000 | Bormann et al. | | 715/839 |
| 6,138,249 A | 10/2000 | Nolet | | |
| 6,151,023 A * | 11/2000 | Chari | | 715/854 |
| 6,173,422 B1 | 1/2001 | Kimura et al. | | 714/57 |
| 6,188,973 B1 * | 2/2001 | Martinez et al. | | 702/188 |
| 6,205,465 B1 * | 3/2001 | Schoening et al. | | 718/102 |
| 6,223,098 B1 | 4/2001 | Cheong et al. | | |
| 6,223,205 B1 * | 4/2001 | Harchol-Balter et al. | | 718/105 |
| 6,321,181 B1 * | 11/2001 | Havens | | 703/13 |
| 6,330,008 B1 * | 12/2001 | Razdow et al. | | 715/772 |
| 6,339,750 B1 * | 1/2002 | Hoyer et al. | | 702/182 |
| 6,401,190 B1 * | 6/2002 | Nishioka et al. | | 712/24 |
| 6,404,743 B1 * | 6/2002 | Meandzija | | 370/254 |
| 6,430,594 B1 * | 8/2002 | Akiyama et al. | | 718/108 |
| 6,493,002 B1 * | 12/2002 | Christensen | | 715/779 |
| 6,505,248 B1 * | 1/2003 | Casper et al. | | 709/224 |
| 6,560,611 B1 | 5/2003 | Nine et al. | | |
| 6,578,064 B1 * | 6/2003 | Saito et al. | | 718/103 |
| 6,587,108 B1 * | 7/2003 | Guerlain et al. | | 345/440 |
| 6,593,940 B1 * | 7/2003 | Petersen et al. | | 715/700 |
| 6,622,155 B1 * | 9/2003 | Haddon et al. | | 718/100 |
| 6,628,287 B1 * | 9/2003 | Duda et al. | | 345/475 |
| 6,658,485 B1 * | 12/2003 | Baber et al. | | 719/314 |
| 6,668,241 B2 * | 12/2003 | Chen et al. | | 702/188 |
| 6,691,259 B1 * | 2/2004 | Mackey et al. | | 714/46 |
| 6,704,782 B1 | 3/2004 | Achtermann et al. | | |
| 6,772,411 B2 * | 8/2004 | Hayes et al. | | 717/127 |
| 6,865,717 B2 * | 3/2005 | Wright | | 715/772 |
| 6,877,015 B1 * | 4/2005 | Kilgore et al. | | 1/1 |
| 6,925,609 B1 * | 8/2005 | Lucke | | 715/804 |
| 6,938,183 B2 * | 8/2005 | Bickel | | 714/12 |
| 6,938,245 B1 * | 8/2005 | Spertus et al. | | 717/127 |
| 6,941,522 B2 * | 9/2005 | Brown | | 715/772 |
| 6,959,265 B1 * | 10/2005 | Candela et al. | | 702/186 |
| 6,965,981 B2 * | 11/2005 | Nishioka et al. | | 712/22 |
| 6,966,033 B1 * | 11/2005 | Gasser et al. | | 715/738 |
| 7,000,150 B1 * | 2/2006 | Zunino et al. | | 714/38 |
| 7,043,696 B2 * | 5/2006 | Santori et al. | | 715/771 |
| 7,051,098 B2 * | 5/2006 | Masters et al. | | 709/224 |
| 7,062,718 B2 * | 6/2006 | Kodosky et al. | | 715/771 |
| 7,074,364 B2 * | 7/2006 | Jahn et al. | | 422/62 |
| 7,103,843 B2 * | 9/2006 | Hand et al. | | 715/734 |
| 7,134,090 B2 * | 11/2006 | Kodosky et al. | | 715/769 |
| 7,155,729 B1 * | 12/2006 | Andrew et al. | | 719/318 |
| 7,178,109 B2 * | 2/2007 | Hewson et al. | | 715/790 |
| 7,206,646 B2 * | 4/2007 | Nixon et al. | | 700/83 |
| 7,210,105 B2 * | 4/2007 | Melamed et al. | | 715/779 |
| 7,272,795 B2 * | 9/2007 | Garding et al. | | 715/736 |
| 7,280,529 B1 * | 10/2007 | Black et al. | | 370/352 |
| 7,284,052 B1 * | 10/2007 | Anderson | | 709/226 |
| 7,298,259 B2 * | 11/2007 | Moriwaki | | 340/539.22 |
| 7,337,365 B2 * | 2/2008 | Zunino et al. | | 714/38 |
| 7,490,323 B2 * | 2/2009 | D'Alo et al. | | 717/178 |
| 7,631,168 B1 * | 12/2009 | Muellers et al. | | 712/220 |
| 2002/0019844 A1 * | 2/2002 | Kurowski et al. | | 709/201 |
| 2002/0032716 A1 * | 3/2002 | Nagato | | 709/104 |
| 2002/0199173 A1 * | 12/2002 | Bowen | | 717/129 |
| 2003/0048292 A1 * | 3/2003 | Branson et al. | | 345/736 |
| 2003/0074387 A1 * | 4/2003 | Tanaka | | 709/103 |
| 2003/0097616 A1 * | 5/2003 | Sullivan | | 714/38 |
| 2003/0200347 A1 * | 10/2003 | Weitzman | | 709/310 |
| 2004/0064552 A1 * | 4/2004 | Chong et al. | | 709/224 |
| 2004/0078734 A1 * | 4/2004 | Deuter | | 714/57 |
| 2004/0205108 A1 * | 10/2004 | Tanaka | | 709/201 |
| 2004/0267918 A1 * | 12/2004 | Guarraci et al. | | 709/223 |
| 2005/0251567 A1 * | 11/2005 | Ballew et al. | | 709/223 |
| 2006/0080389 A1 * | 4/2006 | Powers et al. | | 709/203 |
| 2006/0156072 A1 * | 7/2006 | Khot et al. | | 714/47 |
| 2006/0206831 A1 * | 9/2006 | Beck et al. | | 715/764 |
| 2009/0049443 A1 * | 2/2009 | Powers et al. | | 718/100 |

* cited by examiner

FIG. 2

| Plant | Sold To | Ship To | Shipment | Route | Status | Ackn ID | Ackn Date |
|---|---|---|---|---|---|---|---|
| BTV1 | 278 | 7423 | 0000332674 | QUALCOMM | | ASN2-10182004143521-2023-OAPRDP2 | 10/18/2004 |
| | | | | EMDEX | | 0000000010407344 | 10/18/2004 |
| DUB1 | | 454 | 0000332651 | SAP | | | 10/18/2004 |
| | | | | QUALCOMM | | ASN2-10192004082033-2144-OAPRDP2 | 10/19/2004 |
| | | | | EMDEX | | 0000000010410589 | 10/19/2004 |
| | | | 0000332887 | SAP | | | 10/19/2004 |
| | | | | QUALCOMM | | ASN2-10192004082017-2143-OAPRDP2 | 10/19/2004 |
| | | | | EMDEX | | 0000000010410590 | |

Advanced Ship Notifications — Count
- All entries — 9
- BTV1
  - 0000000278 — 1
  - 0000007423 — 1
  - 0000332674 — 1
- DUB1
  - 0000000278 — 5
  - 0000000454 — 5
  - 0000007423 — 2
- SGP1 — 3

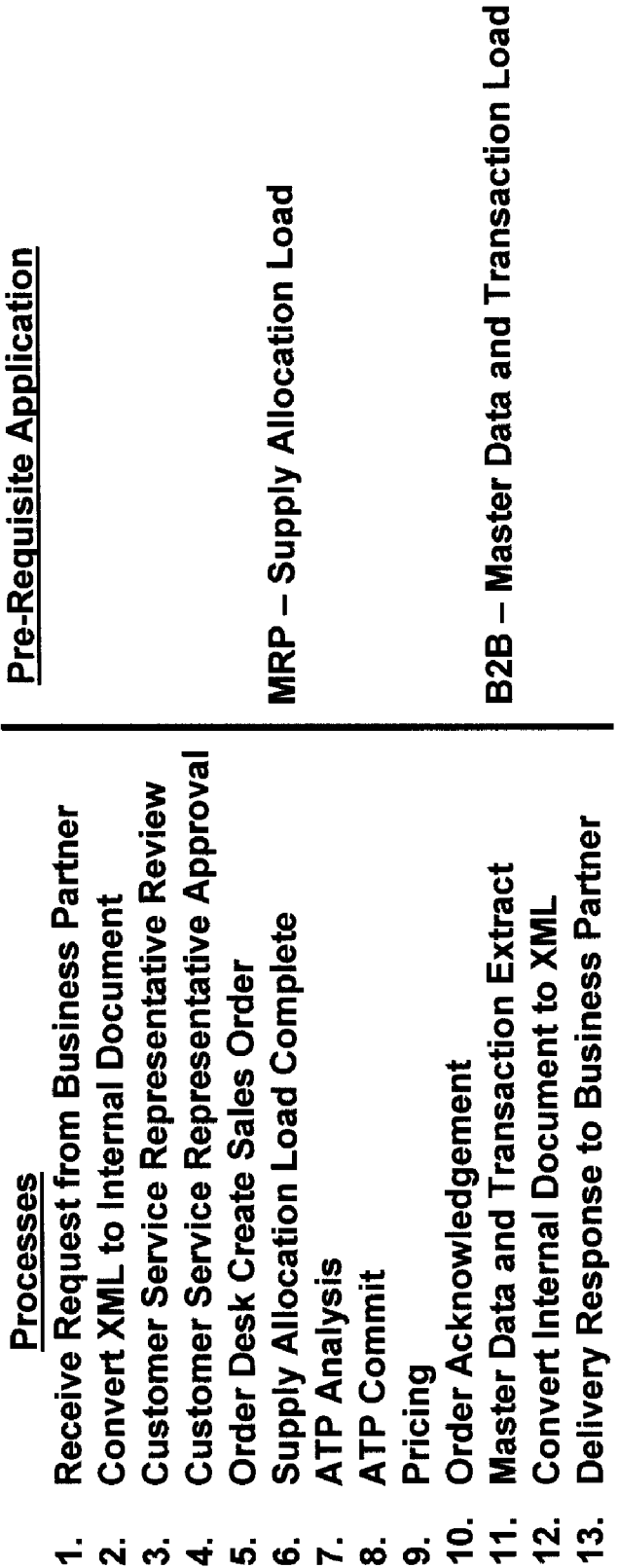

FIG. 7

| Processes | Pre-Requisite Application |
|---|---|
| 1. Receive Request from Business Partner | |
| 2. Convert XML to Internal Document | |
| 3. Customer Service Representative Review | |
| 4. Customer Service Representative Approval | |
| 5. Order Desk Create Sales Order | |
| 6. Supply Allocation Load Complete | MRP – Supply Allocation Load |
| 7. ATP Analysis | |
| 8. ATP Commit | |
| 9. Pricing | |
| 10. Order Acknowledgement | |
| 11. Master Data and Transaction Extract | B2B – Master Data and Transaction Load |
| 12. Convert Internal Document to XML | |
| 13. Delivery Response to Business Partner | |

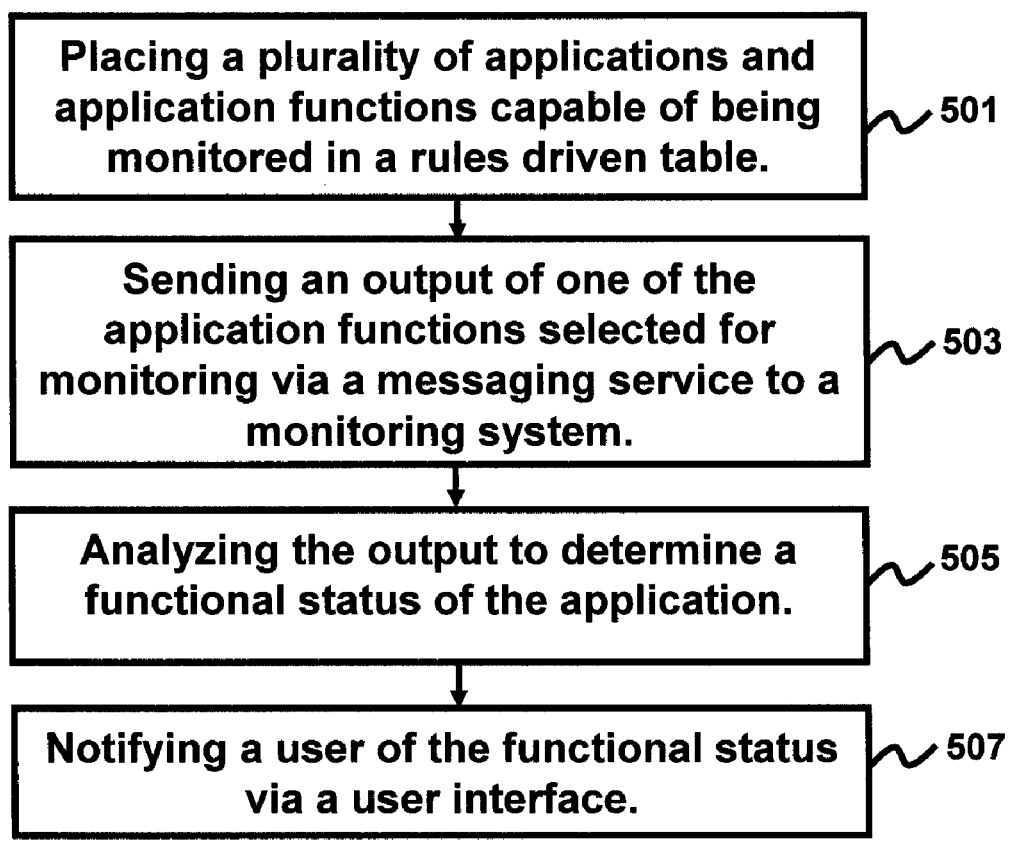

APPLICATION STATUS BOARD MITIGATION SYSTEM AND METHOD

BACKGROUND OF THE INVENTION

1. Field of the Invention

The embodiments of the invention generally relate to computer diagnostic systems and methods, and more particularly to multi-system software/application failure diagnostic systems and methods.

2. Description of the Related Art

Conventionally, when computer software applications are running across multiple systems, one of the problems associated with identifying software malfunctions is that there are generally no readily available tools that can identify, in a cross-platform application process, if jobs (i.e., application protocols) have completed or failed without logging into each individual system and checking on the status of the protocols. Generally, support personnel have to logon to multiple platforms and research job logs and console messages once a problem is realized in order to determine the status of the application, thereby losing valuable software running time. As computer technology continues to develop into more of a real-time and on-demand environment, tools capable of displaying a view of any dependent job stream and status board relating to the processing of the application would be greatly beneficial.

Tivoli®, which is available from International Business Machines, Armonk, N.Y., USA, is a software/application monitoring tool. However, while Tivoli® is beneficial for the purpose it was designed for, it is generally designed to log job failures and alerts once the failures occur. Therefore, there remains a need for a software/application diagnostic tool, which forecasts dependent job time completion or a status view so a user can determine if jobs (i.e., application protocols) are being completed on time, and for failures that do occur, there is a need for a system and method that not only provides an alert, but which also provides a realistic forecast of when all processing will be completed.

SUMMARY OF THE INVENTION

In view of the foregoing, an embodiment of the invention provides a method of monitoring a plurality of applications residing on a plurality of computer systems within a network and a program storage device implementing the method, wherein the method comprises placing a plurality of applications and application functions capable of being monitored in a rules driven table; sending an output of one of the application functions selected for monitoring via a messaging service to a monitoring system; analyzing the output to determine a functional status of the application; and notifying a user of the functional status via a user interface. The method further comprises determining a progress of an order input into the plurality of computer systems within the network. Additionally, in the placing process, the rules driven table comprises an application component table. Moreover, the method comprises predicting when a running time of an application will be completed prior to completion of the application running time. In the notifying process, the user interface comprises a single status board user interface. Also, the analyzing process further comprises determining whether the application functions fail when the applications are running; diagnosing a cause of failure of the application functions; and indicating the cause of failure to the user. The method further comprises reconciliating information across processes supporting the applications and sending alerts to the user interface of errors found in the processes.

Another aspect of the invention provides a method of diagnosing failures in a computer system, wherein the method comprises monitoring a plurality of applications and application functions residing in an application component table; sending an output of a selected application function to a monitoring system; determining a functional status of the application based on the output; and notifying a user of the functional status via a single status board user interface, wherein in the monitoring process, the application component table comprises a rules driven table. The method further comprises predicting when a running time of an application will be completed prior to completion of the application running time. The determining process further comprises determining whether the application functions fail when the applications are running; diagnosing a cause of failure of the application functions; and indicating the cause of failure to the user. Additionally, the method further comprises reconciliating information across processes supporting the applications and sending alerts to the single status board user interface of errors found in the processes.

Another embodiment of the invention provides a computer monitoring system comprising an application component table comprising a plurality of applications and application functions, wherein the applications comprise data identifying a functional status of the applications; a processor adapted to analyze the functional status of the applications based on the data; and a single status board user interface adapted to display the functional status of the applications, wherein the application component table comprises a rules driven table, wherein the processor is adapted to predict when a running time of an application will be completed prior to completion of the application running time. The processor further comprises computer logic circuitry adapted to determine whether the application functions fail when the applications are running; diagnose a cause of failure of the application functions; and indicate the cause of failure to a user. Moreover, the processor further comprises computer logic circuitry adapted to reconciliate information across processes supporting the applications. The computer monitoring system further comprises computer logic circuitry adapted to send alerts to the single status board user interface of errors found in the processes.

The embodiments of the invention achieve several advantages. For example, by implementing the embodiments of the invention, from a single interface, one could quickly discern the status of the application, perform problem determination and resolution, perform reconciliation across processes, and predict the completion times of linked processes. In addition, the ASBMS can be set up to monitor actual time against planned time and when the delta exceeds a predetermined target, alerts can be triggered to pagers, E-mails and Help Desks. The alert can contain pertinent information to assist in quick resolution of the issue.

In addition, since many critical applications currently require real time supervision by operations to ensure timely job completion, the embodiments of the invention provide significant opportunities for labor savings by having all the processing statistics stored centrally within the ASBMS; thus, the application can be mitigated quickly by the user. Without the ASBMS, each application owner would be responsible for analyzing their processing statistics without regard to its effects on the enterprise. Moreover, the embodiments of the invention (1) provide the ability to predict completion times of application steps; (2) provide the ability to log critical run statistics for reconciliation across processes; (3) present opportunities for process optimization; and (4) results in resource reduction due to the ease of use in obtaining the critical data and timely alerts of processing issues.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIGS. 2 through 4 are schematics of user interface screen shots according to the embodiments of the invention;

FIG. 7 is a matrix illustrating common steps of the sales order process of FIG. 6 according to an embodiment of the invention;

FIG. 8 is a flow diagram illustrating a preferred method of an embodiment of the invention.

DETAILED DESCRIPTION OF PREFERRED EMBODIMENTS OF THE INVENTION

Figure 1:
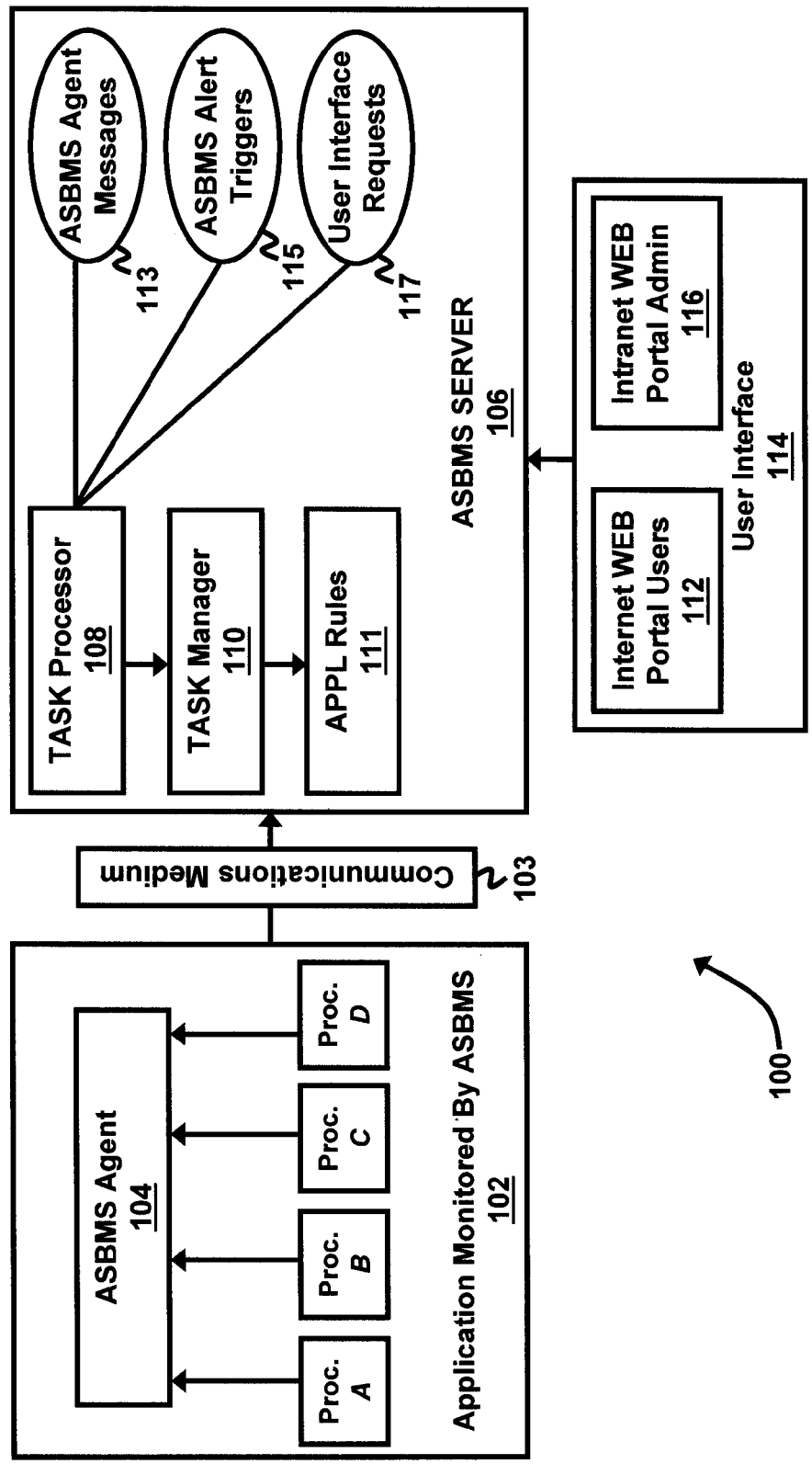
FIG. 1 is a schematic diagram of an application status board mitigation system (ASBMS) according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a software/application diagnostic tool, which forecasts dependent job time completion or a status view so a user can determine if jobs (i.e., application protocols) are being completed on time, and for failures that do occur, there is a need for a system that not only provides an alert, but which also provides a realistic forecast of when all processing will be completed. The embodiments of the invention address these needs by providing a system and method for predicting, monitoring, and mitigating multi-system software failures with a forecaster to the end of job streams, and which automatically estimates job completion times. Referring now to the drawings and more particularly to FIGS. 1 through 9 where similar reference characters denote corresponding features consistently throughout the figures, there are shown preferred embodiments of the invention.

Generally, the embodiments of the invention provide a system and method of monitoring application processes running on multiple platforms throughout the enterprise (i.e., business network) by providing a single application status board mitigation system (ASBMS) 100 that presents the status of the application, completion time estimates of linked processes of the application, alerts users of anomalies as well as output data available for troubleshooting, reconciliation and optimization, and historical trend analysis.

FIG. 1 illustrates the ASBMS 100 which comprises a data model (logical and physical applications) 102 supporting the ASBMS processes (Proc. A-Proc. D); an ASBMS agent 104 supporting each process (Proc. A-Proc. D); an ASBMS server 106 communicating, through a communications medium 103, with the ASBMS agent 104, wherein the ASBMS may be embodied as a plurality of linked application program interfaces. Moreover, the ASBMS server 106 is configured for processing data packets received from the ASBMS agent 104. The data packets comprise application specific data. They may comprise any information that the application deems necessary to aid in the mitigation process. This could include record counts of the database load, or detailed error messages on why the process failed, or a simple acknowledgement stating that the process completed successfully.

The ASBMS 100 further comprises a user interface 114, which may be embodied as an internet web portal 112 or an intranet web portal 116 to support the ASBMS configuration and metadata and to provide the customer support personnel (user/administrator) access to the application status and related details. Each application and application function to be monitored is defined in a rules driven table 111.

The rules driven table 111 comprises information such as when the application function is to be started, the estimated duration that the application function should take, and a variable percentage of how long the ASBMS server 106 should wait before flagging the application function as not successful, and whether or not to send an immediate alert to support for the application function. When an application function is invoked, the ASBMS agent 104 sends an output via the communications medium 103 to the primary ASBMS task processor 108, which may be embodied as an input daemon. The ASBMS task processor 108 then analyzes the output to determine if the application function was successful or not. If the application function is not successful, then the ASBMS task processor 108 sends an alert to a task manager 110 and a function flag is set to "not successful". The task processor 108 services the external requests placed on the ASBMS 100, converts the request into an internal message, and passes the message to the task manager 110 for processing. The task manager 110 analyzes the message and schedules the appropriate method to service the request.

The ASBMS task processor 108 includes ASBMS agent messages 113, which include application data packets associated with the messages. The task processor 108 further includes alert trigger mechanisms 115 adapted to analyze information and configured for sending out various standard alerts for all applications participating in the ASBMS 100. For example, the alert triggers 115 may send alerts pertaining to application failure, schedule requirements, missing components, etc. Additionally, the task processor 108 includes a set of user interface requests 117, which accommodates requests from users through the user interface 114.

Moreover, the ASBMS server 106 includes computer logic (not shown) adapted to provide time completion information in order to predict or forecast the completion of job streams. Conversely, if the application function is successful, the function flag is set for the application function indicating that the process run was "successful". The ASBMS 100 also includes a predefined set of codes indicating the status of an application. Examples of the various states of an application are: (a) "success"—process completed, no action required; (b) "error"—process did not complete, further action required; and (c) "warning"—process completed but messages should be reviewed. The ASBMS 100 depicts the status with meaningful icons on a computer screen. For example, an application with errors could be flagged with a red traffic light, etc. Furthermore, all rules and configuration parameters are maintained in the rules driven table 111. Additionally, the ASBMS application program interface (API) 114 displays the status nodes 151 with downstream affects as shown in FIG. 2.

The ASBMS 100 is embodied as an intranet-based system which addresses the need for one-stop access to review the status of application processes running for various applications across multiple platforms. By presenting support personnel (users) with a screen that displays, by application, whether or not a particular process ran successfully, the support personnel (user) can quickly determine where the problems lie and focus directly on problems instead of logging onto various systems and checking various logs not knowing whether or not a problem occurred.

All processes monitored by the ASBMS 100 report the status and key information by communicating with the ASBMS agent 104. The ASBMS agent API 114 takes the application request and formats it into an application data packet and sends the message to the ASBMS server 106 which is handled by the application task processor 108. By collecting this type of information, the ASBMS 100 is able to consolidate the processes into a single display system. As such, the system 100 provided by an embodiment of the invention increases the productivity or support personnel and also reduces application downtime.

Moreover, the customer support personnel (user) 112 are also able to click on the application function to see details of the last log received from the execution of the application function. The user 112 clicks icons on the navigation screen to click on the application function. FIG. 2 illustrates a screen shot of an example of the navigation screen 150. The gates comprise electronic (Advanced Ship Notifications (ASN) and are defined in the route table 153. The expected delivery time for each route is stored here. The alert trigger 115 (of FIG. 1) uses this information to determine if an acknowledgement is delinquent.

More particularly, FIG. 2 illustrates a list of applications 152 monitored by the ASBMS 100 and is displayed using a tree node 151 graphic user interface (GUI) 150. The user 112 (of FIG. 1) can expand the tree nodes 151 to the desired level and launch into the specific application. Within the application details, tree nodes 151 are also used to group the application data. The user 112 can expand the tree nodes 151 to desired level and display the application details. The left hand side of the GUI 150 comprises the tree nodes 151 and right hand side of GUI 150 comprises the application details 152 using a typical grid GUI. Within the grid, each gate defined in the application is displayed. It is at this level that icons are used to indicate the overall status of the gate, whereby each business partner is considered to be a gate. There are also screens for setting up new application functions to be monitored in addition to maintaining existing functions.

Figure 3:

In the screen shot of FIG. 3, the ASBMS 100 (of FIG. 2) is monitoring electronic ship notifications. Here, the ASBMS 100 tracks the flow of the electronic ASN from a backend system (such as SAP®), through the enterprise business-to-business (B2B) Hub EMDEX, to the end Customer (in this case, Qualcomm®). Here, the application data packet includes logical key information along with status 154 and acknowledgement information 155 such as 'ID' and 'Timestamp'. The status 154 is represented with the checkered flag indicating the acknowledgement was "successful".

Again, with regard to FIG. 1, The ASBMS administrator 116 is responsible for configuring the application rules, adding/removing applications to the ASBMS server 106, adding gates/processes to the ASBMS server 106, defining gates, and configuring process cycle management in the server 106. The ASBMS user 112 is adapted to view the application status, view the process status, analyze run statistics, compare one process cycle to another, and estimate process completion times. In this regard, the users 112 and administrators 116 communicate with the task manager 110, whereby the task manager 110 is responsible for adding/removing applications/gates from the server 106, loading data packets, comparing the process cycles, and calculating the projected process completion times. The access of these screens can be controlled through existing and well-known entitlement schemes used by the enterprise.

Figure 4:

Also, administrators 116 are able to add/delete/modify scheduled timeframes for the functions to execute. This is accomplished by using timeframes and other key information about the application, which are configured in the ASBMS 100 by the system administrator 116. This information is stored at the gate level of the application. For example, in monitoring electronic ASN, timeframes would be established for each business partner receiving the ASN, as illustrated in the ASN acknowledgement screen shot of FIG. 3. Additionally, FIG. 4 illustrates a business rules screen shot of an alert trigger rules table according to an embodiment of the invention. As indicated in FIG. 4, the flexible rules determine which gates are critical and require alerts if an acknowledgement is not received. The table shown in FIG. 4 also indicates the route sequence. For example, using data from the business rules screen and the alert trigger rules screen, if an acknowledgement from EMDEX gate for customer 278 is not received within 15 minutes of the SAP gate, then an alert is sent to an appropriate distribution list.

In addition, the ASBMS application program interface 114 displays results that need to be compared for accuracy based on the configuration. Thus, the ASBMS 100 allows for reconciling across processes. In a typical network application such as that required in supporting a B2B hub there are many data extraction and load processes. The results from each extract are compared with the results of the corresponding load process. Within the ASBMS 100, these processes are represented as various gates within the application. The GUI 150 allows the user a glance to compare record counts from each process. Also, record counts could be compared systematically to gates within the process that are linked in this manner and the discrepancies are highlighted.

The ASBMS 100 monitors applications throughout the enterprise by providing a single status board that shows the status of the processes (for example, Proc. A-Proc. D in FIG. 1) supporting the application(s) 102. The processes (Proc. A-Proc. D) of an application 102 could themselves be another application monitored by the ASBMS 100. The ASBMS 100 not only shows the application's status including (1) reasons for failure; (2) reconciliation information across processes; (3) estimated completion times of linked processes based upon statistical analysis; but it also (4) sends alerts for any anomalies found in the processes. The ASBMS agents 104 report the processes status along with error information and run statistics. By collecting, grouping, and analyzing this information, the ASBMS 100 highlights processes with errors along with reasons for failure. The information is also available to reconcile processing statistics across processes. The ASBMS 100 also estimates completion times of gates within a process by performing statistical analysis of historical data captured by the ASBMS 100. The ASBMS 100 analyzes gate information and sends alerts if gates are not completed in pre-defined times for the gate.

Many types of applications could be used according to the embodiments of the invention. For example, a common type of application could include traditional networked applications that have many data feeds, organizations, triggers, and processes that are critical to the business and that are time sensitive and which may affect customer perception and ultimately customer satisfaction; i.e., customer order commit cycle time or on-time delivery to the customer. In the first case, the ASBMS 100 not only monitors the order commit process itself, but also the order commit dependencies, such as the timely execution of a planning engine and the subsequent loading of supply lines to the available-to-promise application. The ASBMS 100 accomplishes this by defining each process as a gate within the application in the ASBMS 100. A gate could also be a complex application comprised of many gates. The ASBMS agents 104 report the processing statistics to the ASBMS 100 thus allowing the user to monitor the application's overall status.

Figure 5:
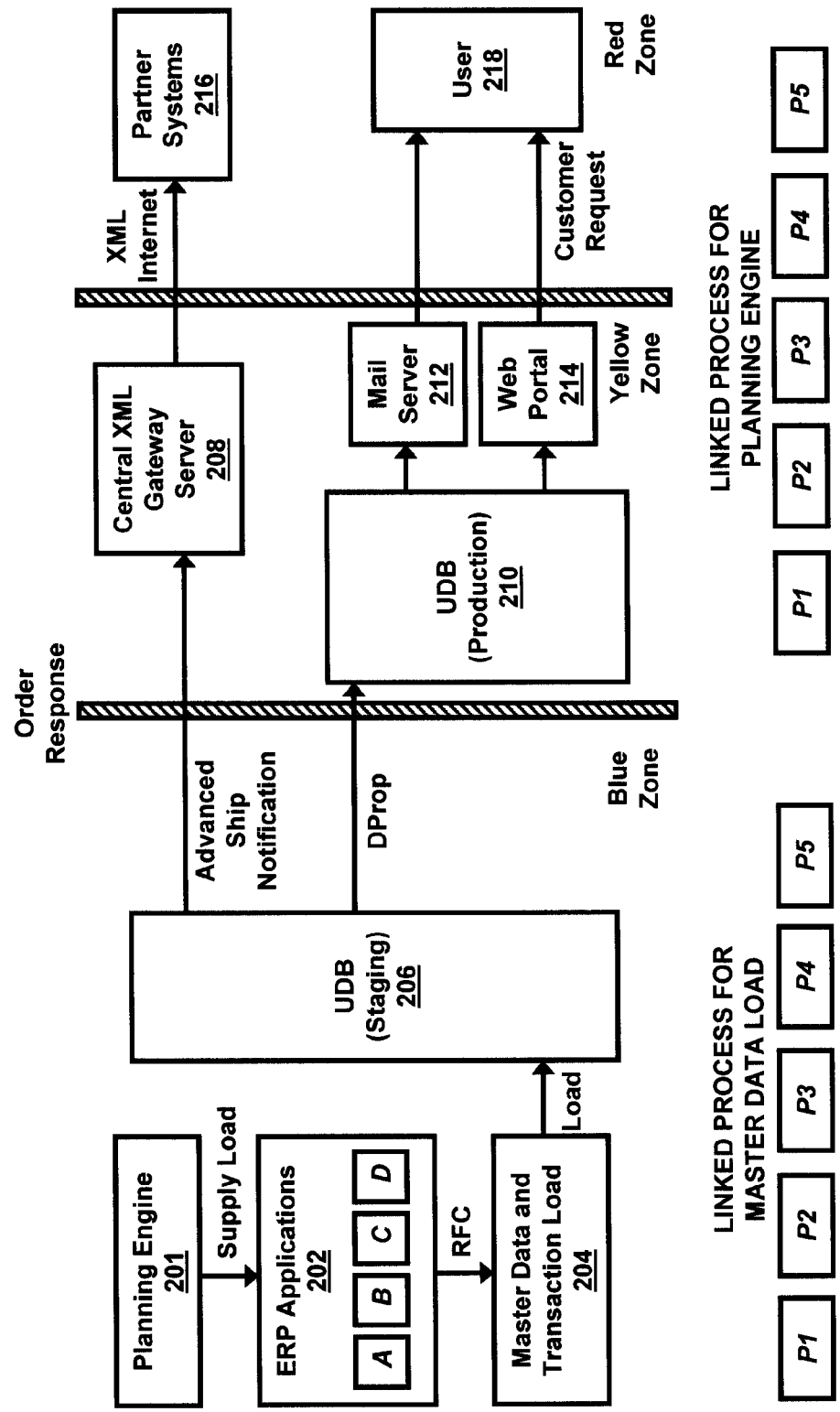
FIG. 5 is a schematic diagram of two applications linked to backend system processes according to an embodiment of the invention.

FIG. 5 depicts two such applications: Master Data Extracts supporting a B2B hub and Manufacturing Resource Planning (MRP) Run. In FIG. 5 the two applications along with their key sub processes and linkages are shown. For example, the Master Data and Transaction Load 204 comprises five processes labeled P1 through P5. Additionally, the Planning Engine 201 comprises five processes also labeled P1 through P5 The processes, along with key processing information are shown. For simplicity, run times and record counts are depicted in Table 1.

TABLE 1

Run times and Record Counts for Processes in FIG. 5

| Process Names (for Linked Process for Master Data Load) | Run Stats (minutes) | Record Counts | Process Names (for Linked Process for Planning Engine) | Run Stats (minutes) |
| --- | --- | --- | --- | --- |
| P1 - Load Parts List | 75 | 48,128 | P1 - Demand Prep | 120 |
| P2 - Load Customer Master | 44 | 12,056 | P2 - Engine Run | 218 |
| P3 - Load Wafer Data | 5 | 2,016 | P3 - Tables Loaded | 54 |
| P4 - Order Response Extract | 13 | 118 | P4 - ATP Approved | 60 |
| P5 - Shipment Extract | 34 | 312 | P5 - Supply Load | 45 |

FIG. 5 shows an overall process and data flow involved in building a data warehouse supporting both a B2B hub and a web portal using the ASBMS 100 (of FIG. 1). The planning engine 201 represents a backend application that comprises sub-processes/gates P1-P5(shown bottom right of FIG. 5). Enterprise Resource Planning (ERP) Applications 202 depicts four master data extracts A, B, C, D, which extract data from the ERP Application 202 and begin corresponding Master Data and Transaction Load processes 204. From the arrows in FIG. 5, it can be seen that planning engine 201 can be represented as a gate in ERP Application 202 in the ASBMS 100 (of FIG. 1) and that ERP Application 202 can be represented as a gate in Master Data and Transaction Load processes 204 in the ASBMS 100. Within the ASBMS 100, the user 218 can view the status of the planning engine 201 with P1-P5 as the gates. Also, the user 218 can view the status of the ERP Application 202 with processes P1-P5 as gates and also with planning engine 201 as the gate, thus linking processes with complex processes if so desired.

The ASBMS 100 (of FIG. 1) monitors the processes P1-P5 participating in the ASBMS 100. In FIG. 5, planning engine 201, ERP applications 202 and master data and transaction load 204 are monitored by the ASBMS 100. The gates defined to each process can be monitored by the ASMBS 100. Planning engine 201 can be defined as a gate within ERP application 202 thus allowing the overall status of planning engine 201 to be considered in the statistical analysis of the EPR applications 202. The universal database (UDB) (Staging stage) 206 accepts loads from the master data and transaction load processes 204 and sends an advanced notification (in this example, a shipping notification) to a central XML (extensible Markup Language) gateway server 208 as well as a DProp (DataPropagator) to the UDB (Production stage) 210. The UDB 210 communicates through a mail server 212 and a web portal 214, which facilitate consumer requests to/from a user 218. The central XML gateway server 208 communicates with partner systems 216 through an (XML) internet.

In FIG. 5, elements 206, 208, 210, 212, 214, and 216 are optional gates that can be defined to the ASBMS 100 (of FIG. 1). These optional gates may be used in loading the master and transaction data processes 204 to the web portal 214. For example, the optional gates used to track the P1 load might be P1 (master and transaction data processes 204, UDB 206, and UDB 210). The blue, red, and yellow zones indicated in FIG. 5 are typical "firewall" zones as it relates to B2B and web portals environments. These zones are shown in FIG. 5 to provide an enterprise view of typical applications that could be monitored by the ASBMS 100 (of FIG. 1). Processes P1-P3, as indicated in FIG. 5, are the applications that could be monitored by the ASBMS 100 (of FIG. 1), wherein the ASBMS 100 is flexible on how an application is defined.

Figure 6:
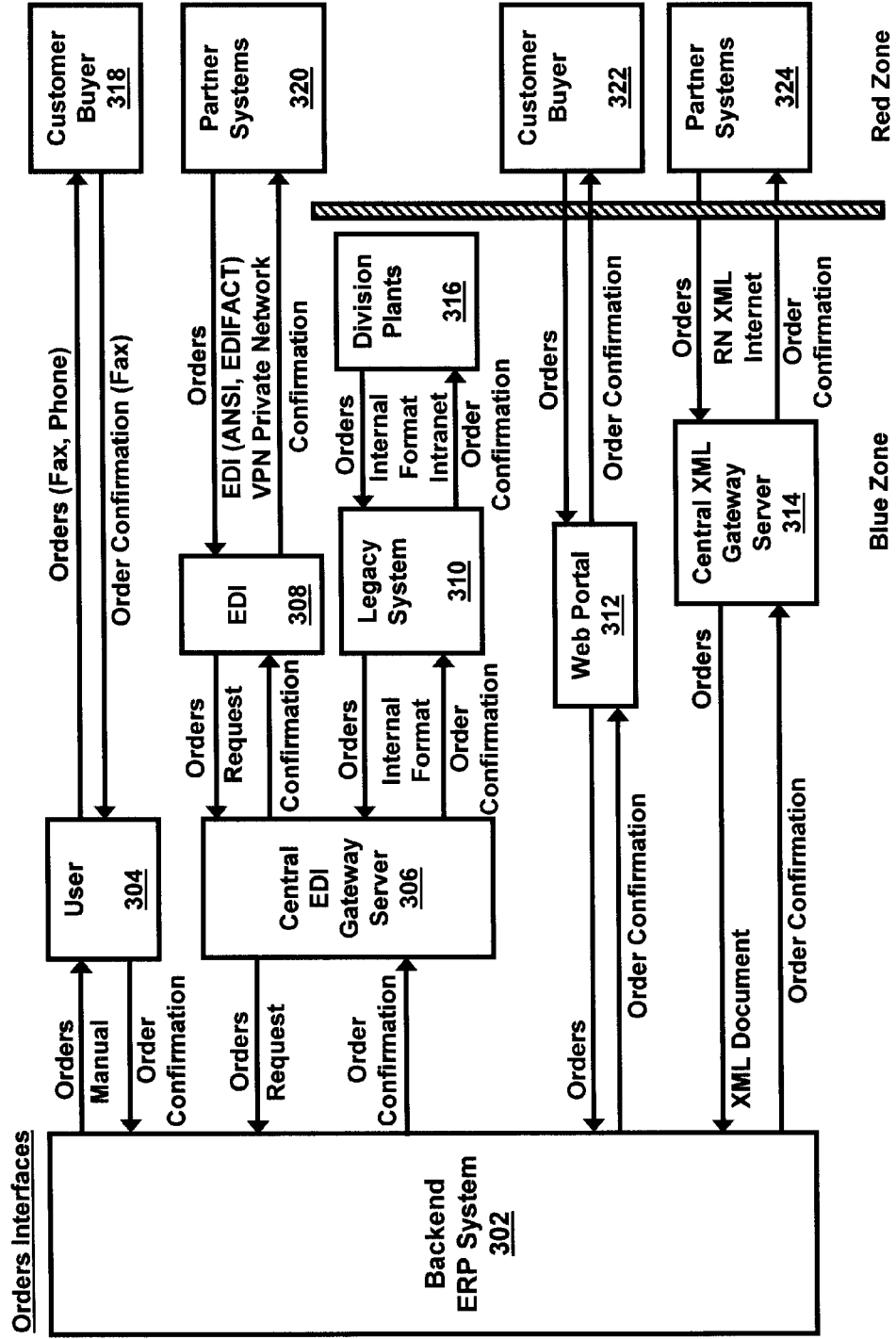
FIG. 6 is a schematic diagram of an example of a sales order process implementing the embodiments of the invention.

A more elaborate use of the ASBMS 100 includes serving as a tool to monitor and tracking the life cycle of a typical business object such as sales orders, invoices, advance ship notifications, and other customer deliverables. In addition, the ASBMS 100 plays an important role in manufacturing processes such as monitoring/comparing tool performance; i.e., tool availability, output, and quality. For example, FIG. 6 illustrates the monitoring and tracking of the life cycle of a typical business object; i.e., the flow of a sales order, starting with an electronic document received from a business partner and ending with delivering the electronic order acknowledgement to the business partner. The common steps of the processes in FIG. 6 are more specifically described in FIG. 7. In this scenario, the ASBMS 100 has the ability to: (1) show the status of the order at any point in the process; (2) highlight any anomalies, such as orders pending customer service representative (CSR) review for more than suggested time; and (3) predict completion times of linked processes, such as when the order would be committed or acknowledged. The CSR is responsible for ensuring the customer's request is serviced accordingly within the ERP application.

FIG. 6 depicts examples of various means methods for an enterprise to receive a purchase order request into their backend ERP system 302, which is considered a sales order within the backend system 302. Each label box in FIG. 6 represents a process that the enterprise may want to monitor within the ASBMS 100. In this scenario, the application is a sales order. The gates would be each process participating in the ASBMS 100. At any point in time, the ASBMS 100 could show the processing statistics at each gate. Likewise, the ASBMS 100 could show and send alerts if the sales order request does not flow to the next gate in a timely fashion (i.e., within a predetermined time limit). Processes 1-12 of FIG. 7 are key gates within the sales order application of FIG. 6. These are gates that the enterprise might monitor in the ASBMS 100 (of FIG. 1). The enterprise may also want to pre-request other backend applications such as MRP—Supply Allocation Load. The linkage is flexible and can be configured by the ASBMS administrator 116 (of FIG. 1).

Specifically, FIG. 6 illustrates a data flow diagram that depicts various methods of a supplier exchanging business information with its customers/business partners. The several numbered boxes in FIG. 6 represent industry standard processes in an e-business environment. In a first method, the customer/buyer 318 faxes or phones a sales order request to a CSR 304. The CSR 304 takes the request and manually loads the order to the ERP System 302. In a second method, a business partner 320 sends a request electronically either over an electronic data interchange (EDI) or a Virtual Private Network (VPN). This request is received in an EDI mailbox 308 and then is unloaded and routed to the EDI gateway server 306 which formats and routes the requests to the ERP System 302. In a third method, divisions within the enterprise 316 may place inter-company orders. This is often transmitted using legacy data delivery systems 310. These requests are then routed to the gateway server 306 which formats and routes the request to the ERP System 302. In a fourth method, customers/buyers 322 use the supplier's web portal 312 to initiate the sales order request. The web portal 312 formats and routes the request directly to the ERP System 302. In a fifth method, a business partner 324 sends the request electronically using RosettaNet (RN) business transactions (B2B), which are serviced by the XML gateway server 314. The XML gateway server 314 formats and routes the request to the ERP System 302. The blue and red zones indicated in FIG. 6 are typical "firewall" zones as it relates to B2B and web portals environments.

FIG. 8, which refers to components provided in FIGS. 1 through 7, illustrates a flow diagram of a method of monitoring a plurality of applications residing on a plurality of computer systems within a network according to an embodiment of the invention, wherein the method comprises placing (501) a plurality of applications and application functions capable of being monitored in a rules driven table; sending (503) an output of one of the application functions selected for monitoring via a messaging service to a monitoring system 106; analyzing (505) the output to determine a functional status of the application; and notifying (507) a user of the functional status via a user interface 114. The method further comprises determining a progress of an order input into the plurality of computer systems within the network. Additionally, in the placing process (501), the rules driven table comprises an application component table.

Moreover, the method comprises predicting when a running time of an application will be completed prior to completion of the application running time. In the notifying process (507), the user interface 114 comprises a single status board user interface. Also, the analyzing process (505) further comprises determining whether the application functions fail when the applications are running; diagnosing a cause of failure of the application functions; and indicating the cause of failure to the user. The method further comprises reconciling information across processes supporting the applications and sending alerts to the user interface of errors found in the processes.

Figure 9:
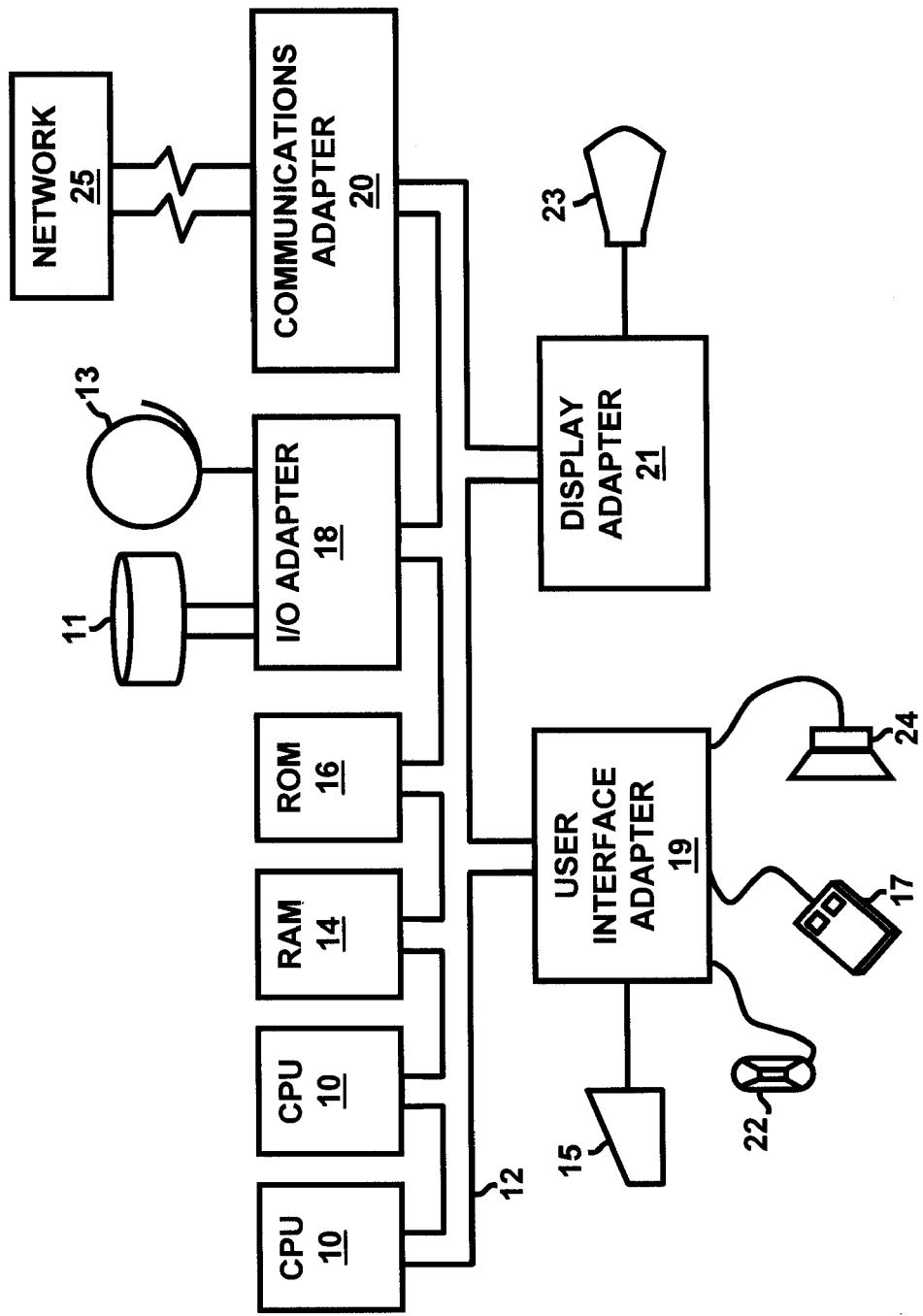
FIG. 9 is a schematic diagram of a computer system according to an embodiment of the invention.

A representative hardware environment for practicing the embodiments of the invention is depicted in FIG. 9. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments of the invention achieve several advantages. For example, by implementing the embodiments of the invention, from a single interface, one could quickly discern the status of the application, perform problem determination and resolution, perform reconciliation across processes, and predict the completion times of linked processes. In addition, the ASBMS 100 can be set up to monitor actual time against planned time and when the delta exceeds a predetermined target, alerts can be triggered to pagers, E-mails and Help Desks. The alert can contain pertinent information to assist in quick resolution of the issue.

In addition, since many critical applications currently require real time supervision by operations to ensure timely job completion, the embodiments of the invention provide significant opportunities for labor savings by having all the processing statistics stored centrally within the ASBMS 100; thus, the application can be mitigated quickly by the user 112. Without the ASBMS 100, each application owner would be responsible for analyzing their processing statistics without regard to its effects on the enterprise. Moreover, the embodiments of the invention (1) provide the ability to predict completion times of application steps; (2) provide the ability to log critical run statistics for reconciliation across processes; (3) present opportunities for process optimization; and (4) results in resource reduction due to the ease of use in obtaining the critical data and timely alerts of processing issues.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. A method of monitoring a plurality of application functions for a plurality of applications running across a plurality of computer systems in order to forecast the end of job streams, said method comprising:
    storing, in memory on a server, a rules driven table defining said plurality of applications and said applications functions for each of said applications running across said plurality of computer systems, said application functions being capable of being monitored and said rules driven table specifying at least start times of application functions, estimated durations of application functions, and criteria for non-success of application functions;
    when one of said application functions of one of said applications is invoked in a job-stream, receiving, by said server via a messaging service, an output comprising a data packet containing processing information specific to said one of said application functions;
    analyzing, by a processor of said server and based on said rules driven table, said output to determine a functional status of said one of said application functions, said functional status comprising one of not successfully completed and successfully completed;
    determining, by said processor and based on said functional status of said one of said application functions, on said rules driven table, and on historical data, projected completion times for other application functions of said one of said applications, said other application functions being in said job-stream and dependent upon said one of said application functions; and
    displaying, on a user interface in communication with said server, an application status board for all of said applications running across said plurality of computer systems, said application status board indicating at least said functional status of said one of said application functions and said projected completion times for said other application functions of said one of said applications.

2. The method of claim 1, further comprising determining a progress of an order input into said plurality of computer systems within said network.

3. The method of claim 1, wherein said rules driven table comprises an application component table.

4. The method of claim 1, further comprising, based on said projected completion times, predicting when a running time of said one of said applications will be completed prior to actual completion of said running time.

5. The method of claim 1, wherein the analyzing process further comprises:
    determining whether said one of said application functions failed during running of said one of said applications;
    diagnosing a cause of failure of said one of said application functions; and
    indicating said cause of failure to said user.

6. The method of claim 1, further comprising reconciling information across processes supporting said applications.

7. The method of claim 6, further comprising sending alerts to said user interface of errors found in said processes.

8. A method of monitoring a plurality of application functions for a plurality of applications running across a plurality of computer systems to mitigate job failures and forecast the end of job streams, said method comprising:
    storing, in memory on a server, a rules driven application component table defining said plurality of applications and said applications functions for each of said applications running across said plurality of computer systems, said application functions being capable of being monitored and said rules driven application component table specifying at least start times of application functions, estimated durations of application functions and criteria for non-success of application functions;
    when one of said application functions of one of said applications is invoked in a job-stream, receiving, by said server via a messaging service, an output comprising a data packet containing processing information specific to said one of said application functions;
    analyzing, by a processor of said server and based on said rules driven application component table, said output to determine a functional status of said one of said application functions, said functional status comprising one of not successfully completed indicating an application function failure and successfully completed;
    diagnosing, by said processor, a cause of said application function failure, when said application function failure is indicated;
    determining, by said processor and based on said functional status of said one of said application functions, on said rules driven application component table, and on historical data, projected completion times for other application functions of said one of said applications, said other application functions being in said job-stream and dependent upon said one of said application functions; and
    displaying, by a user interface in communication with said server, an application status board for all of said applications running across said plurality of computer systems, said application status board indicating at least said functional status of said one of said application functions, said cause of said application function failure, when said application function failure is indicated, and said projected completion times for said other application functions of said one of said applications.

9. The method of claim 8, further comprising, based on said projected completion times, predicting when a running time of said one of said applications will be completed prior to actual completion of said running time.

10. The method of claim 8, further comprising reconciling information across processes supporting said applications.

11. The method of claim 10, further comprising sending alerts to said user interface of errors found in said processes.

* * * * *